United States Patent [19]

Bottomley

[11] Patent Number: 5,615,209
[45] Date of Patent: Mar. 25, 1997

[54] METHOD AND APPARATUS FOR CDMA SIGNAL ORTHOGONALIZATION

[75] Inventor: Gregory E. Bottomley, Cary, N.C.

[73] Assignee: Ericsson Inc., Research Triangle Park, N.C.

[21] Appl. No.: 507,714

[22] Filed: Jul. 26, 1995

[51] Int. Cl.$^6$ ........................................................ H04J 13/00
[52] U.S. Cl. ........................... 370/342; 375/200; 375/206
[58] Field of Search ............................. 370/18; 375/200, 375/205, 206

[56] References Cited

U.S. PATENT DOCUMENTS

| | | | |
|---|---|---|---|
| 5,099,493 | 3/1992 | Zeger et al. | 375/205 |
| 5,101,417 | 3/1992 | Richley et al. | 375/206 |
| 5,105,435 | 4/1992 | Stilwell | 375/1 |
| 5,151,919 | 9/1992 | Dent | 375/1 |
| 5,157,686 | 10/1992 | Omura et al. | 375/200 |
| 5,204,874 | 4/1993 | Falconer et al. | 375/200 |
| 5,272,721 | 12/1993 | Mikoshiba et al. | 375/208 |
| 5,345,468 | 9/1994 | Bi | 375/1 |
| 5,345,472 | 9/1994 | Lee | 375/205 |
| 5,414,699 | 5/1995 | Lee | 370/18 |
| 5,416,797 | 5/1995 | Gilhousen et al. | 375/205 |

OTHER PUBLICATIONS

A. J. Viterbi, "Very Low Rate Convolutional Codes for Maximum Theoretical Performance of Spread–Spectrum Multiple–Access Channels," *IEEE J. Select. Areas Commun.*, vol. 8. pp. 641–649, May 1990.

W. L. Brogan, "*Modern Control Theory*", Englewood Cliffs, NJ: Prentice–Hall, 1982. (Section 4.7).

M. K. Varanasi and B. Aazhang, "Multistage Detection in Asynchronous Code–Division Multiple–Access Communications," *IEEE Trans. Commun.*, vol. 38, pp. 509–519, Apr. 1990.

T. K. Kashihara, "Adaptive Cancellation of Mutual Interference in Spread Spectrum Multiple Access," *ICC '80*, 1980.

R. Kohno et al., "Combination of an Adaptive Array Antenna and a Canceller of Interference for Direct–Sequence Spread–Spectrum Multiple–Access System," *IEEE J. Sel. Areas Commun.*, vol. 8, pp. 675–682, May 1990.

R. Kohno et al., "An Adaptive Canceller of Co–Channel Interference for Spread Spectrum Multiple–Access Communication Networks in a Power Line", *IEEE J. Sel. Areas Commun.*, vol. 8, pp. 691–699, May 1990.

R. Kohno et al., "Adaptive Cancellation of Interference in Direct–Sequence Spread–Spectrum Multiple Access Systems", *Proc. IEEE Global Telecommun. Conf. 1987*, vol. 1, pp. 630–634, Nov. 1987.

R. Kohno et al., "Combination of Cancelling Intersymbol Interference and Decoding of Error–Correcting Code," *IEE Proc.*, vol. 113, Pt. F, No. 3, pp. 224–231, Jun. 1986.

T. Masamura, "Spread Spectrum Multiple Access System with Intrasystem Interference Cancellation," *Trans. IECE*, vol. E71, No. 3, pp. 223–231, Mar. 1988.

Y. C. Yoon et al., "A Spread–Spectrum Multiaccess System with Cochannel Interference Cancellation for Multipath Fading Channels," *IEEE J. Sel. Areas Commun.*, vol. 11, pp. 1067–1075, Sep. 1993.

*Primary Examiner*—Hassan Kizou
*Assistant Examiner*—Kwang B. Yao
*Attorney, Agent, or Firm*—Burns, Doane, Swecker & Mathis, L.L.P.

[57] ABSTRACT

Orthogonalization techniques are disclosed which can be used, for example, to improve subtration of CDMA signals from a composite spread spectrum signal or to improve detection of CDMA signals from the composite spread spectrum signal. According to exemplary embodiments, a Gram-Schmidt orthogonalization process is used to modify signature sequences which are each associated with a particular CDMA signal in the spread spectrum composite signal. These modified signature sequences can then be used to spread correlations of the original signature sequences in the subtraction process or in the detection process to improve performance. Pre-orthogonalization according to the present invention, eliminates or mitigates multiple access interference.

16 Claims, 5 Drawing Sheets

METHOD AND APPARATUS FOR CDMA SIGNAL ORTHOGONALIZATION

BACKGROUND

The present invention generally relates to radio communications systems and more particularly, to minimizing the effects of multiple access interference in a Direct-Sequence Code Division Multiple Access (DS-CDMA) communications system.

Direct-sequence Code Division Multiple Access (DS-CDMA) techniques are being applied to cellular and personal radio communication systems. With such an approach, all signals share the same frequency spectrum at the same time. For example, suppose that user i conveys an information symbol $b_i$ by transmitting $b_i s_i(k)$, the product of the information symbol $b_i$ and the code or signature sequence $s_i(k)$. By using different signature sequences for different users, the information symbol of a particular user may be determined by correlating the received signal with the user's known signature sequence. Because these codes are rarely orthogonal, the separation is not perfect, so that signals interfere with one another, thereby degrading performance.

One method for dealing with interference in CDMA systems is to perform some form of subtractive demodulation, where each signal, starting with the strongest, is demodulated then subtracted from the composite received signal. If the correct amplitude and phase of each signal is known, as well as the information symbol value, then subtraction is perfect, and only the particular signal of interest is subtracted. Such an approach is described in A. J. Viterbi, "Very low rate convolutional codes for maximum theoretical performance of spread-spectrum multiple-access channels," *IEEE J. Select. Areas Commun.*, vol. 8, pp. 641–649, May 1990.

In practice, the amplitude, phase and symbol values are either unknown or must be estimated, giving rise to estimation noise which leads to subtraction error. One way of estimating these values is to correlate the received data with the known signature sequence. When subtraction occurs, this approach effectively nulls out all components of the received signal that are aligned with the signal being removed, including a small amount of all the other signals. This form of subtractive demodulation is described in U.S. Pat. No. 5,151,919 to Dent which disclosure is incorporated here by reference. Parallel as well serial subtraction is possible.

Because the amplitude, phase, and symbol estimation are noisy, subtraction error occurs, which can accumulate to the detriment of performance. In particular, it has been observed that when the second signal is removed, noise appears in the resultant signal that is aligned with the first signal that was removed. Similarly, when the third signal is removed, noise appears that is aligned with the first two signals. Thus, there is a need for a way to eliminate or minimize the noise introduced by the subtraction process.

SUMMARY

These and other drawbacks and limitations of conventional CDMA demodulation techniques are overcome according to the present invention, wherein a pre-orthogonalization procedure is employed. This procedure can be used, for example, to improve subtraction of CDMA signals from a composite spread spectrum signal or to improve detection of CDMA signals within the composite spread spectrum signal.

According to exemplary embodiments, a Gram-Schmidt orthogonalization process is used to modify signature sequences which are each associated with a particular CDMA signal in the spread spectrum composite signal. These modified signature sequences can then be used to spread correlations of the original signature sequences with the received composite (e.g., to improve subtraction of each CDMA signal) or in the correlation process to improve detection. Pre-orthogonalization according to the present invention, eliminates or mitigates the creation of noise which can occur when using conventional CDMA demodulation techniques.

BRIEF DESCRIPTION OF THE DRAWINGS

The foregoing, and other objects, features and advantages will be more readily understood upon reading the following detailed description in conjunction with the drawings in which.

DETAILED DESCRIPTION

Figure 1:
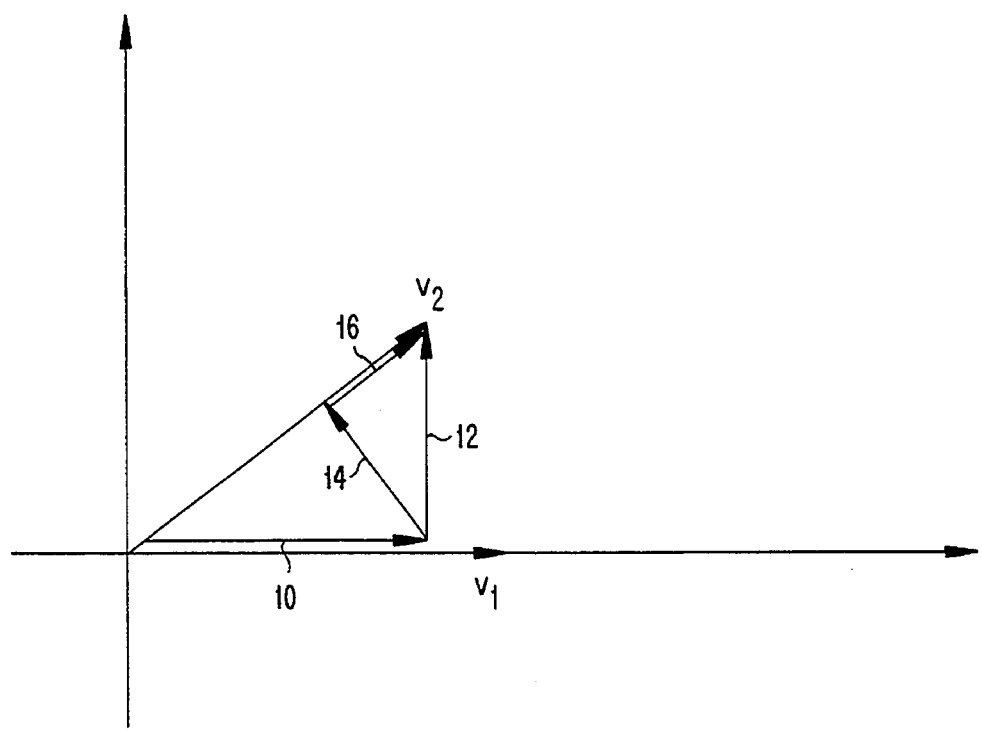
FIG. 1 is a geometric illustration of the subtraction process.

According to exemplary embodiments of the present invention, a pre-orthogonalization approach is used, which is based in part on the Gram-Schmidt procedure for orthogonalizing sequences. The Gram-Schmidt procedure is described in detail below. Pre-orthogonalization approaches according to the present invention can, for example, be used in two ways. First, these approaches can improve subtraction by reducing subtraction error in a subtractive demodulation receiver. Second, these approaches can be used to improve detection by eliminating interference in the detection process by correlating the received signal to modified signature sequences that are orthogonal with respect to one another.

An improved subtraction approach is described first using an example, in which the received signal r(n) during a given symbol period is a composite of three signals, so that:

$$r(n) = c_1 b_1 s_1(n) + c_2 b_2 s_2(n) + c_3 b_3 s_3(n) \tag{1}$$

where $c_i$ is a complex channel gain that models the amplitude and phase of the signal. For simplicity of discussion, assume signal 1 is the strongest, signal 2 the second strongest, and so on.

With conventional subtractive demodulation, the first (strongest) signal would be detected then removed. Detection occurs by correlating the received signal with the complex conjugate of $s_i(n)$ (the conjugate is not needed if the sequence is real valued, such as ±1). This gives detection statistic $z_1$ which can be expressed as:

$$z_1 = \frac{1}{N} \sum_{n=1}^{N} r(n)s_1^*(n) \qquad (2)$$

though the division by N would normally be omitted when implemented to reduce the complexity of the system. The superscript * denotes complex conjugation. This detection statistic can be analyzed by substituting equation (1) in equation (2), giving:

$$z_1 = c_1 b_1 + c_2 b_2 R_{21} + c_3 b_3 R_{31} \qquad (3)$$

where $$R_{ab} = \frac{1}{N} \sum_{k=1}^{N} s_a(k) s_b^*(k) \qquad (4)$$

is the cross-correlation of signature sequences a and b and the superscript "*" denotes complex conjugation. Observe that the first term in equation (3), i.e., $c_1 b_1$, represents the desired signal, whereas the remaining terms represent interference.

Demodulation uses the detection statistic $z_1$ to determine the information being conveyed. For example, if $c_1$ is known or estimated and $b_1$ is ±1, then $z_1$ can be multiplied by $c_1^*$ and the sign of the real part of the product taken as the detected value of $b_1$. If differential modulation is used, then $z_1$ can be multiplied by the conjugate of the previous value of $z_1$ to determine the information sent. In general, the way in which the detection statistic $z_1$ is used to determine the information depends on the type of modulation used and the capabilities of the receiver as will be apparent to those skilled in the art.

To remove signal 1, the received signal is correlated to $s_1(n)$ to give an estimate of the amplitude, phase, and symbol value together. This is the detection statistic $z_1$. So, the received signal with signal 1 removed, i.e., the resultant signal denoted $r_1$, is given by:

$$r_1(n) = r(n) - z_1 s_1(n) \qquad (5)$$

Note that all of the components of the received signal which are aligned with the first signal have been removed, since correlating $r_1(n)$ with $s_1(n)$ gives:

$$\frac{1}{N} \sum_{n=1}^{N} r_1(n) s_1^*(n) = z_1 - z_1 = 0 \qquad (6)$$

Next, signal 2 is demodulated and removed. The detection statistic for signal 2 is obtained by correlating $r_1(n)$ to $s_2(n)$, so that:

$$z_2 = \frac{1}{N} \sum_{n=1}^{N} r_1(n) s_2^*(n) \qquad (7)$$

This detection statistic can be analyzed by substituting equations (5), (3), and (1) in equation (7), giving:

$$\begin{aligned} z_2 &= \frac{1}{N} \sum_{n=1}^{N} [r(n) - z_1 s_1(n)] s_2^*(n) \qquad (8)\\ &= c_1 b_1 R_{12} + c_2 b_2 + c_3 b_3 R_{32} - z_1 R_{12} \\ &= c_1 b_1 R_{12} + c_2 b_2 + c_3 b_3 R_{32} - \\ &\quad c_1 b_1 R_{12} - c_2 b_2 R_{21} R_{12} - c_3 b_3 R_{31} R_{12} \\ &= c_2 b_2 (1 - |R_{21}|^2) + c_3 b_3 (R_{32} - R_{31} R_{12}) \end{aligned}$$

where the property that $R_{ba} = R_{ab}^*$ has been used. Two observations can be made from equation (8). First, signal 1 does not interfere with signal 2 as the term $c_1$ is absent in the final expression. Secondly, a part of signal 2 was removed when signal 1 was removed, as evidenced by the subtraction of $|R_{21}|^2$ from the signal term $c_2 b_2$.

The second signal is then removed from the spread spectrum composite signal, generating another resultant signal $r_2(n)$, as follows:

$$r_2(n) = r_1(n) - z_2 s_2(n) \qquad (9)$$

This second residual signal has no component aligned along the second signal's signature sequence. However, in forming the second residual signal, energy has been introduced along the first signal's signature sequence. This can be seen by correlating the second residual signal with the first signature sequence, giving:

$$x = \frac{1}{N} \sum_{n=1}^{N} r_2(n) s_1^*(n) \qquad (10)$$

This correlation can be analyzed by substituting equations (9), (8), (5), (3), and (1) in equation (10), giving:

$$\begin{aligned} x &= \frac{1}{N} \sum_{n=1}^{N} [r(n) - z_1 s_1(n) - z_2 s_2(n)] s_1^*(n) \qquad (11)\\ &= z_1 - z_1 - z_2 R_{21} \\ &= -[c_2 b_2 (1 - |R_{21}|^2) + c_3 b_3 (R_{32} - R_{31} R_{12})] R_{21} \end{aligned}$$

Observe that x is not necessarily zero, which indicates that energy aligned with the first signal has been introduced. Thus, energy along the first signal is no longer nulled out or zero as it was after the first signal's initial removal at equation (5). This newly introduced energy doesn't depend on the first signal's strength, but does depend on the second and third signals' strengths. Accordingly, when detecting the third signal, interference from the second signal will be present. This can be seen by forming the third signal's detection statistic:

$$z_3 = \frac{1}{N} \sum_{n=1}^{N} r_2(n) s_3^*(n) \qquad (12)$$

This statistic can be analyzed by substituting equations (9), (8), (5), (3), and (1) in equation (12), giving:

$$\begin{aligned} z_3 &= \frac{1}{N} \sum_{n=1}^{N} [r(n) - z_1 s_1(n) - z_2 s_2(n)] s_3^*(n) \qquad (13)\\ &= c_1 b_1 R_{13} + c_2 b_2 R_{23} + c_3 b_3 - z_1 R_{13} - z_2 R_{23} \\ &= c_1 b_1 R_{13} + c_2 b_2 R_{23} + c_3 b_3 - \\ &\quad c_1 b_1 R_{13} - c_2 b_2 R_{21} R_{13} - c_3 b_3 |R_{31}|^2 - \\ &\quad c_2 b_2 (1 - |R_{21}|^2) R_{23} - c_3 b_3 |R_{32}|^2 + c_3 b_3 R_{31} R_{12} R_{23} \\ &= c_3 b_3 [1 - |R_{31}|^2 - |R_{32}|^2 + R_{31} R_{12} R_{23}] + \\ &\quad c_2 b_2 [|R_{21}|^2 R_{23} - R_{21} R_{13}] \end{aligned}$$

Note that there is an interference term proportional to $c_2$ in equation (13), implying that the second signal is interfering with the third, even though all energy was nulled out along the second signal's signature sequence by forming $r_2(n)$ at equation (9).

This problem can be viewed geometrically, for example, by thinking of the signals as vectors. In FIG. 1, the first two signals (i.e., the strongest two signals in a spread spectrum composite) are shown as vectors $v_1$ and $v_2$. The second signal, $v_2$, is also shown as the sum of two component vectors, one (i.e., vector 10) aligned with the first signal $v_1$ and one (i.e., vector 12) orthogonal to the first signal. When the first signal is removed, the component of the second signal aligned with the first signal is also removed. Thus, vector 10 is removed, leaving vector 12. Vector 12 can also be expressed as the sum of two component vectors, for example a vector 14 aligned with the second signal $v_2$, and a vector 16 orthogonal to the second signal $v_2$. The second signal is removed by removing all components that are aligned with vector $v_2$. Thus, vector 16 is removed, but vector 14 is not, leaving a portion of the second signal in the residual signal. Observe that vector 16 has a nonzero projection onto vector $v_1$, so that part of the second signal residual energy is aligned with the first signal axis.

From this vector point of view, it would be preferable if, when removing the second signal, all energy along vector 12 is removed rather than all energy along vector $v_2$. This would remove the remaining energy of the second signal which subsequently causes interference. Notice that vector 12 is the part of vector $v_2$ that is orthogonal to vector v. The Gram-Schmidt procedure can be used to determine this component.

The Gram-Schmidt procedure is exemplified in section 4.7 of W. L. Brogan, Modem Control Theory, Englewood Cliffs, N.J.: Prentice-Hall, 1982, which disclosure is incorporated here by reference. The Gram-Schmidt sequences $u_i(n)$ are formed from the original signature sequences $s_i(n)$ according to the following procedure:

$$u_1(n) = t_1(n) = s_1(n) \tag{14a}$$

$$t_i(n) = s_i(n) - \sum_{m=1}^{i-1} \frac{C(s_m,t_m)}{C(t_m,t_m)} t_m(n) \tag{14b}$$

$$u_i(n) = t_i(n)/\sqrt{C(t_i,t_i)} \tag{14c}$$

where $$C(x,y) = \sum_{k=1}^{N} x(k)y^*(k) \tag{15}$$

Observe that $$C(s_a,s_b) = N\,R_{ab} \tag{16}$$

When subtracting a signal, the Gram-Schmidt sequence may be used, so that the subtraction procedure according to exemplary embodiments of the present invention are given by:

$$r'_0(n) = r(n) \tag{17a}$$

$$r'_i(n) = r'_i(n-1) - C(r'_{i-1}, u_i) u_i(n) \tag{17b}$$

One technique for simplifying equation (17b) is to note that the square root term from equation (14c) appears twice, since $u_i$ appears twice, so that equation (17b) can be rewritten as:

$$r'_i(n) = r'_i(n-1) - \frac{C(r'_{i-1},t_i)}{C(t_i,t_i)} t_i(n) \tag{18}$$

avoiding the square root function, which can be difficult to realize. A second technique for simplifying equation (17b) is to note that correlating $r'_{i-1}$ with $t_i$ is the same as correlating $r'_{i-1}$ with $s_i$. This is because, from equation (14b), $t_i$ can be expressed as $s_i$ plus components along $s_k$, where $k<i$. Since $r'_{i-1}$ has zero components along previous signals, correlation with these components gives zero. So, the subtraction can be expressed as:

$$\begin{aligned}
r'_i(n) &= r'_i(n-1) - \frac{C(r'_{i-1},s_i)}{C(t_i,t_i)} t_i(n) \\
&= r'_i(n-1) - \frac{z'_i}{C(t_i,t_i)} t_i(n) \\
&= r'_i(n-1) - z'_i t'_i(n)
\end{aligned} \tag{19}$$

where $$z'_i = \sum_{n=1}^{N} r'_{i-1}(n) s_i^*(n) \tag{20}$$

$$t'_i = \frac{t_i(n)}{C(t_i,t_i)} \tag{21}$$

Note that $z'_i$ can be used as the detection statistic. Using the original signature sequences when forming $z'_i$ is advantageous, since these sequences are typically $\pm 1$ values, so that correlation can be implemented with additions and subtractions. The $t_i(n)$ sequence and its correlation with itself may be pre-computed and stored in a receiver, as may the $t'_i(n)$ sequence.

Thus, according to exemplary embodiments of the present invention, subtraction is performed using detection statistics and modified signature sequences, in which the modified sequences are orthogonal to one another. An illustration of this exemplary embodiment of the invention is now given using the previous example. The first signal is demodulated and removed in the same way as described above, since $u_1(n)=s_1(n)$. However, the second signal is removed in a different way. Instead of using equation (9), the second residual signal is formed by:

$$r'_2(n) = r_1(n) - \frac{z'_2}{C(t_2,t_2)} t_2(n) \tag{22}$$

From the Gram-Schmidt procedure outlined above, $$t_2(n) = s_2(n) - \frac{C(s_2,s_1)}{N} s_1(n) = s_2(n) - R_{21} s_1(n) \tag{23}$$

and $$C(t_2,t_2) = N(1 - |R_{21}|^2) \tag{24}$$

So, equation (22) can be analyzed by substituting equations (24), (23), (8) and (5) in equation (22), giving:

$$r'_2(n) = r(n) - z_1 s_1(n) - \frac{z_2}{1 - |R_{21}|^2} [s_2(n) - R_{21} s_1(n)] \tag{25}$$

The analysis continues by substituting equations (3) and (1) in equation (25), giving:

$$\begin{aligned}
r'_2(n) = \ & c_1 b_1 s_1(n) + c_2 b_2 s_2(n) + c_3 b_3 s_3(n) - \\
& [c_1 b_1 + c_2 b_2 R_{21} + c_3 b_3 R_{31}] s_1(n) - \\
& \frac{1}{1 - |R_{21}|^2} [c_2 b_2 (1 - |R_{21}|^2) + \\
& c_3 b_3 (R_{32} - R_{31} R_{12})] s_2(n) + \\
& \frac{R_{21}}{1 - |R_{21}|^2} [c_2 b_2 (1 - |R_{21}|^2) + \\
& c_3 b_3 (R_{32} - R_{31} R_{12})] s_1(n) \\
= \ & \left[ \frac{c_3 b_3 (R_{32} R_{21} - R_{31} |R_{12}|^2)}{1 - |R_{21}|^2} - c_3 b_3 R_{31} \right] s_1(n) - \\
& \frac{c_3 b_3 (R_{32} R_{31} R_{12})}{1 - |R_{21}|^2} s_2(n) + c_3 b_3 s_3(n)
\end{aligned} \tag{26}$$

Now it will be shown that $r'_2(n)$ has no component along either signal 1 or signal 2. Computing the correlation of $r'_2(n)$ with signal 1, using equation (26), $$x_1 = \frac{1}{N} \sum_{n=1}^{N} r'_2(n)s_1*(n) \qquad (27)$$

$$= \left[ \frac{c_3b_3(R_{32}R_{21} - R_{31}|R_{12}|^2)}{1 - |R_{21}|^2} - c_3b_3R_{31} \right] -$$

$$\frac{c_3b_3(R_{32} - R_{31}R_{12})}{1 - |R_{21}|^2} R_{21} + c_3b_3R_{31}$$

$$= 0$$

Also, computing the correlation of $r'_2(n)$ with signal 2, using equation (26), $$x_2 = \frac{1}{N} \sum_{n=1}^{N} r'_2(n)s_2*(n) \qquad (28)$$

$$= \left[ \frac{c_3b_3(R_{32}R_{21} - R_{31}|R_{12}|^2)}{1 - |R_{21}|^2} - c_3b_3R_{31} \right] R_{12} -$$

$$\frac{c_3b_3(R_{32} - R_{31}R_{12})}{1 - |R_{21}|^2} + c_3b_3R_{32}$$

$$= c_3b_3 \frac{R_{32}|R_{21}|^2 - R_{31}R_{12}|R_{21}|^2 - R_{31}R_{12}(1 - |R_{21}|^2)}{1 - |R_{21}|^2} -$$

$$c_3b_3 \frac{R_{32} - R_{31}R_{12} - R_{32}(1 - |R_{21}|^2)}{1 - |R_{21}|^2}$$

$$= c_3b_3 \frac{R_{32}|R_{21}|^2 - R_{31}R_{12} + R_{31}R_{12} - R_{32}|R_{21}|^2}{1 - |R_{21}|^2}$$

$$= 0$$

Thus, the new residual signal $r'_2$ arrived at by way of signal processing according to this exemplary embodiment of the present invention, has no components along signals 1 and 2. Also, the complex gains $c_1$ and $c_2$ are absent from the final expression for $r'_2$ in equation (26). Thus, when detecting signal 3, interference from signals 1 and 2 is not present.

Figure 2:
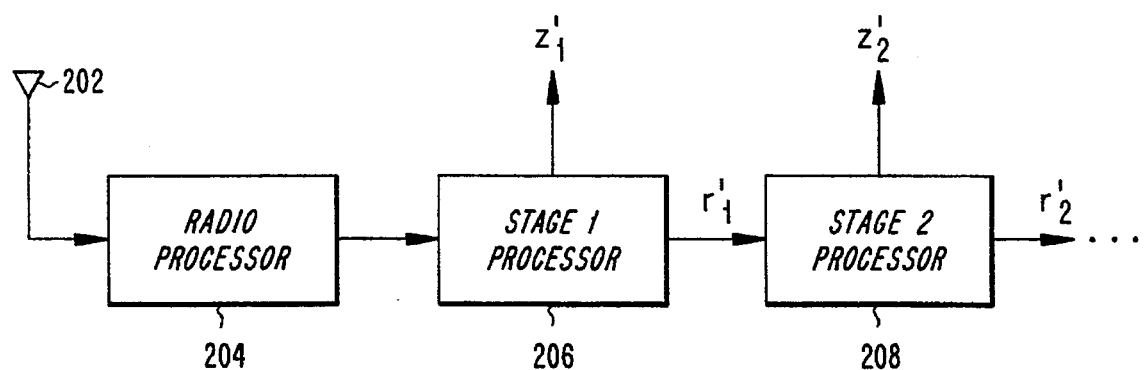
FIG. 2 is a block diagram of signal processing according to an exemplary embodiment of the present invention.

An exemplary system for implementing the afore-described signal processing to provide this improved subtraction form of pre-orthogonalization is shown in FIG. 2. An antenna 202 receives the radio signal, which is processed by the radio processor 204 to provide complex-valued, baseband chip samples. Radio processing as exemplified by block 204 is well known in the art and includes filtering, amplification, mixing, and sampling operations. The resulting baseband signal is provided to the stage 1 processor 206, which produces a detection statistic for the signal 1, $z'_1$, the strongest signal, and a residual signal, $r'_1$, which represents the received signal with signal 1 removed. This residual signal is provided to a stage 2 processor 208, which is similar to the stage 1 processor, except that it operates with regard to signal 2. Those skilled in the art will appreciate that any number of processing stages can be provided in the receiver of FIG. 2, depending on the desired number of signals to be obtained.

Figure 3:
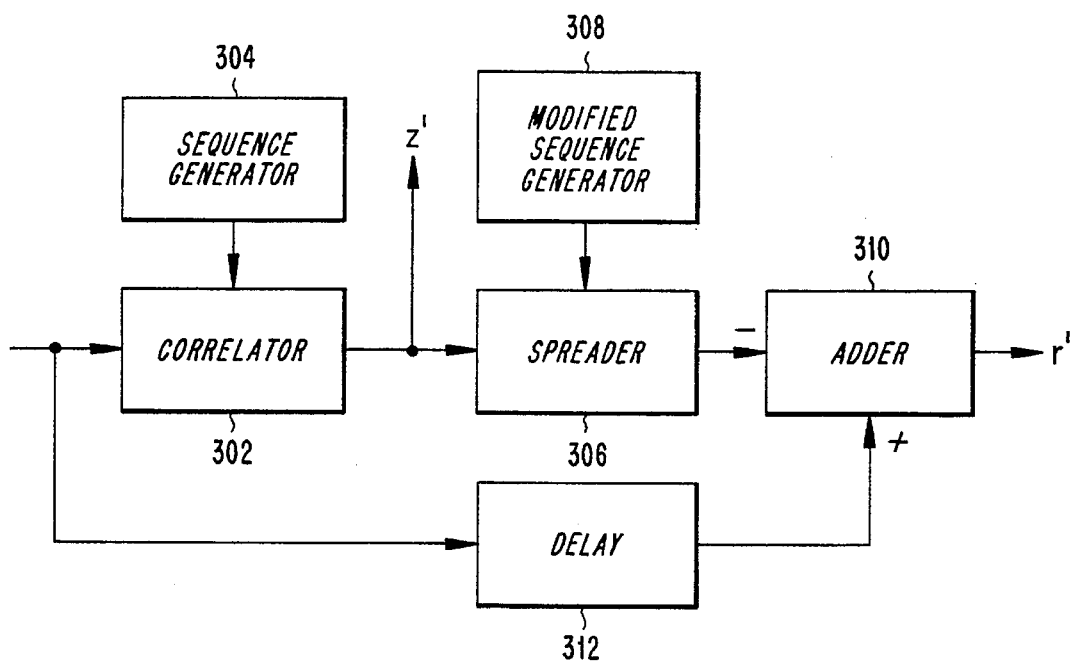
FIG. 3 is a block diagram of an exemplary stage processor according to the present invention.

A block diagram of an exemplary stage processor is given in FIG. 3. The input to the stage processor is correlated in correlator 302 to a signature sequence provided by sequence generator 304. Because these sequences are typically ±1, the correlator 302 can be implemented using addition and subtraction logic. The output of correlator 302 is the detection statistic z' which is used by the rest of the receiver to determine the information sent on the corresponding signal, and which is also provided to spreader 306, where it is spread with a modified sequence provided by the modified sequence generator 308. The modified sequences $t'_i(n)$ can be generated as described above.

Because the detection statistic and the modified sequence are both nonbinary, e.g., ±1, ±2, ±3, etc., the spreader 306 would normally require multiplications to be performed. The output of spreader 306 is provided to adder 310, which subtracts the output of spreader 306 from the stage processor input that has been delayed by delay unit 312. The output of adder 310 is the residual signal, r'(n).

An alternative implementation is possible in which the baseband signal is stored in a buffer. When the residual signal is formed, it is used to overwrite the received signal in the buffer. Double buffering can be used, so that part of the data can be processed while more data is being received.

One implementation concern is the fact that the modified sequences, $t'_i(n)$, are not binary. Thus, the spreader 306 multiplies nonbinary chip values with the nonbinary detection statistic N times, i.e., once for each chip sample. The number of multiplications can be reduced by expressing $t'_i(n)$ in terms of coefficients $a_{ik}$ and the original sequences, so that:

$$t'_i(n) = a_{ii}s_i(n) + a_{i,i-1}s_{i-1}(n) + \ldots + a_{i,1}s_1(n) \qquad (29)$$

The signal that is subtracted is then given by:

$$z'_i t'_i(n) = z'_i a_{ii}s_i(n) + z'_i a_{i,i-1}s_{i-1}(n) + \ldots + z'_i a_{i,1}s_1(n) \qquad (30)$$

Thus, subtraction can be performed by first forming only i products, $a_{ik} z'_i$ for k=1 to i, then performing subtraction by adding or subtracting these products from each received chip value, depending on the signs of the original signature sequence values. This form of subtraction, in which subtraction of the i'th signal is performed using i subtractions, can either be done sequentially or in parallel.

Figure 4:
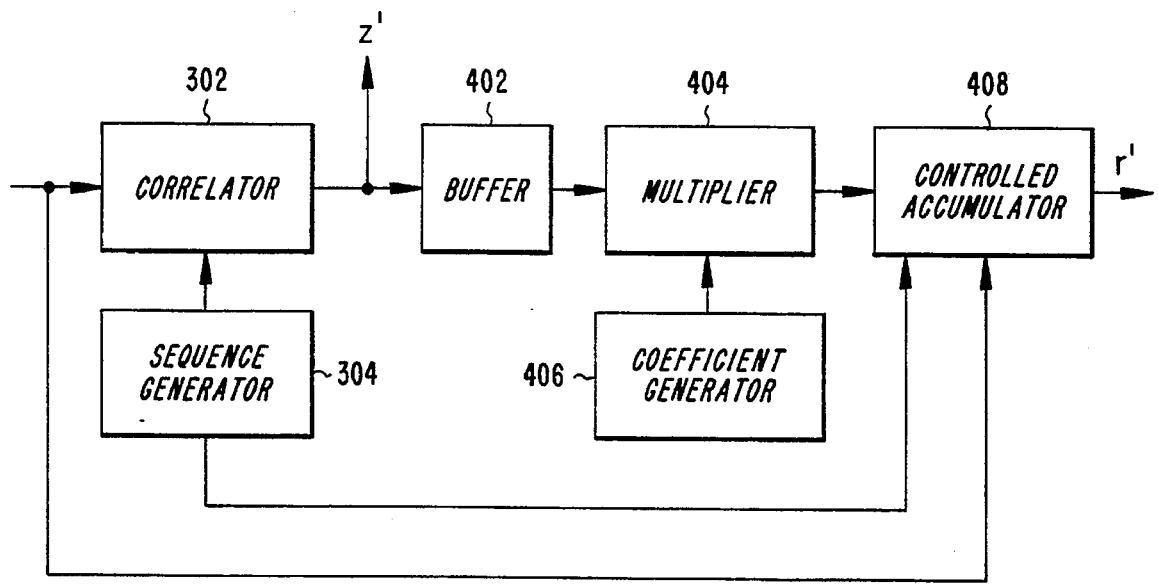
FIG. 4 is a block diagram of another exemplary embodiment of a stage processor.

A sequential form of this exemplary embodiment of the stage processor is illustrated in FIG. 4, where like elements from previous figures are identified using the same reference numeral. The input is correlated in correlator 302 with a signature sequence provided by sequence generator 304. The result is the detection statistic z', which is stored in buffer 402. Then, for one or more iterations, the output of buffer 402 is multiplied in multiplier 404 with a coefficient provided by coefficient generator 406 to produce a product, which is added or subtracted in each element in the controlled accumulator 408, depending on the control information provided by the sequence generator. There are N elements in the controlled accumulator 408, one for each chip sample, which are initially loaded with received chip samples. An iteration is performed for each term on the right side of equation (30). After the iterations are completed, the accumulated result from controlled accumulator 408 is provided as an output.

A second way to use pre-orthogonalization according to the present invention is for improved detection, so that subtraction of signals can be omitted. The basic idea is to detect the signals using modified signature sequences, using either $t_i$, $t'_i$, or $u_i$. For example, the detection statistic according to this exemplary embodiment would be given by:

$$Z_i = \sum_{n=1}^{N} r(n)t_i*(n) \qquad (31)$$

Since the second modified signature sequence is orthogonal to the first sequence, interference from the presence of the first signal is avoided. Similarly, the third modified sequence is orthogonal to the first two.

Figure 5:
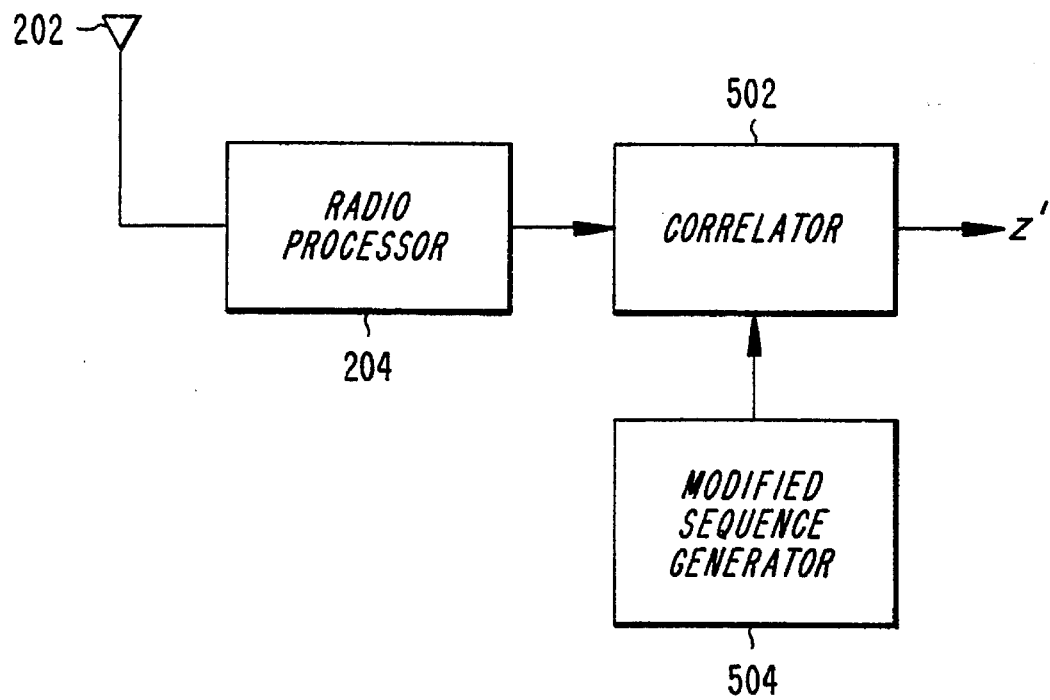
FIG. 5 is a block diagram of another exemplary embodiment of the present invention.

An exemplary implementation of this detection form of pre-orthogonalization is shown in FIG. 5. Therein, an antenna 202 receives the radio signal, which is processed by the radio processor 204 to provide complex-valued, baseband chip samples. The resulting baseband signal is provided to correlator 502, which correlates to a modified sequence provided by modified sequence generator 504. The result gives detection statistic Z' for a particular signal. Because the received data samples are nonbinary and the modified sequences are nonbinary, the correlator 502 would typically include multipliers. If more than one signal is to be detected, then multiple correlators can be used, either in series or in parallel. Alternatively, the output of the radio processor 204 may be buffered, so that the same correlator can be used repeatedly with different modified sequences corresponding to different signals.

One implementation concern is the fact that the modified sequences, $t'_i$, $t_i$ or $u_i$, are not binary. Thus, the correlator 502 multiplies nonbinary chip values with the nonbinary received data samples N times, i.e., once for each chip sample. The number of multiplications can be reduced by expressing the modified sequence, for example, $t'_i$, in terms of parameters $b_{ik}$, and the original sequences s(n), so that:

$$t'_i(n) = s_i(n) + b_{i,i-1} s_{i-1}(n) + \ldots + b_{i,1} s_1(n) \tag{32}$$

Substituting equation (32) in equation (31), the detection statistic becomes:

$$Z_i = y_i + b_{i,i-1} y_{i-1} + \ldots + b_{i,1} y_1 \tag{33}$$

where $$y_k = \sum_{n=1}^{N} r(n) s_k^*(n) \tag{34}$$

Thus, the detection statistic can be obtained by first correlating the data to the original sequences, which can be implemented with additions and subtractions since $s_i(n)$ are typically ±1 valued. Then, the final detection statistic is obtained by accumulating $y_i$ with only $_{i-1}$ products, $a_{ik} y_k$ for k=1 to i−1. In this way, the number of multiplications can be reduced. This exemplary form of detection, in which detection of the i'th signal is performed using i−1 additions, can either be done sequentially or in parallel.

Note that the $y_k$ values are independent of i, i.e., the signal being detected. In fact, $y_1$ is the detection statistic for the first signal. Also, $y_2$ is needed when computing $Z_2$. Thus, the $y_k$ values can be computed once, either in series or in parallel, and stored in a memory device (not shown) in the receiver. Also, the $b_{i,k}$ depend only on the signature sequences, so that they may be pre-computed or computed only rarely. Thus, the i'th detection statistic can be formed by correlating the received signal to the original i'th signature sequence, then adding correlation terms related to previous detection statistics, which would have been stored.

Figure 6:
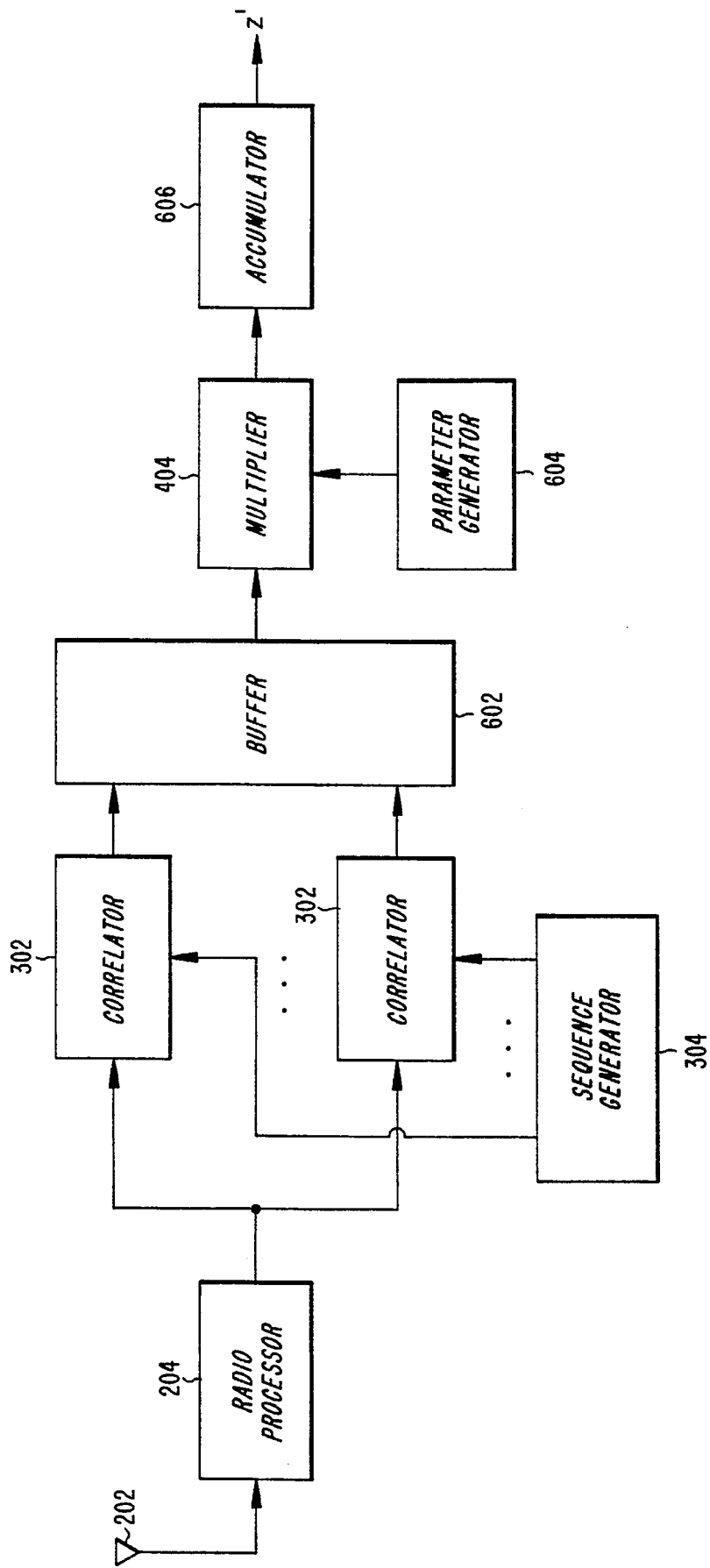
FIG. 6 is a block diagram of yet another exemplary embodiment of the present invention.

Another exemplary embodiment for improved detection using pre-orthogonalization according to the present invention, based on parallel correlation but serial detection, is shown in FIG. 6. An antenna 202 receives the radio signal, which is processed by the radio processor 204 to provide complex-valued, baseband chip samples. The resulting baseband signal is provided to a bank of correlators 302, which correlate the received signal to the signature sequences provided by sequence generator 304. The results are the correlations $y_k$, which are stored in a buffer 602. To detect a particular signal, a series of products are formed by multiplying outputs of buffer 602 with parameters provided by parameter generator 604 in multiplier 404. These products are accumulated in accumulator 606, which is initialized to zero. To detect another signal, the accumulator would be reset to zero and the multiplying and accumulating operations would be repeated, with parameters corresponding to the other signal.

In general, subtraction CDMA schemes can be implemented in serial or parallel form. The present invention applies to both such forms. Consider an example in which a group of K signals are be demodulated in parallel. Using the improved detection pre-orthogonalization approach, each signature sequence would be pre-orthogonalized with respect to the other signature sequences in the group. Thus, there would be K Gram-Schmidt procedures, each with a different sequence at the bottom of the list. It will be apparent to one skilled in the art that the present invention may be applied to other forms of parallel subtraction. Also, the technique can be used as the first stage of a recursive demodulation scheme, such as that described in M. K. Varanasi and B. Aazhang, "Multistate detection in asynchronous code-division multiple-access communications," *IEEE Trans. Commun.*, vol. 38, pp. 509–519, Apr. 1990, which disclosure is incorporated here by reference.

While the examples given so far correspond to one form of DS-CDMA, the present invention is readily applied to other forms of DS-CDMA, as will be apparent to one skilled in the art. In general, an M'ary symbol for user i, denoted $b_i$, can be sent by transmitting one of M possible signature sequences associated with user i, denoted $s_{i,k}(n)$. Observe that the examples so far have been a special case, where $s_{i,k}(n) = b_i s_i(n)$. In these examples, when components aligned with $s_i(n)$ are nulled, effectively all components along all $s_{i,k}(n)$ are nulled, since all the $s_{i,k}(n)$ are proportional to $s_i(n)$. Thus, nulling does not depend on which symbol is detected, preventing any form of decision feedback error.

However, for the general case, this is not necessarily so. There are two approaches. In the first approach, only the detected signal is nulled out, so that nulling occurs along the detected $s_{i,k}(n)$, but not along the other sequences. This minimizes the number of subtractions, but allows for the possibility that the wrong sequence is nulled out when the wrong symbol is detected. Performance can be improved by delaying subtraction until further processing, such as channel decoding, can be applied to improved detection. There is a special case, when the signal happens to be a known pilot signal, so that the known $s_{i,k}(n)$ rather than the detected one can be subtracted.

With the second approach, nulling occurs on all the $s_{i,k}(n)$, regardless of which one was detected. The advantage is that decision error feedback is avoided. The disadvantage is that M subtractions must be performed per signal. Since each subtraction also removes a little bit of the remaining signals, this causes a larger loss of the remaining signal energy. A hybrid approach would be to null out a subset of the $s_{i,k}(n)$ sequences, such as the subset that corresponds to the first, second, . . . best detection statistic.

Another special case of DS-CDMA is described in the afore-incorporated U.S. Pat. No. 5,151,919 to Paul W. Dent. With this approach, Walsh-Hadamard (WH) coding is used to spread the signal, and user's are distinguished by applying a user-specific scrambling mask to the WH codeword. The present invention may be applied to this system using a series of descrambling and fast Walsh transform operations. Since the M possible WH code words span the N dimensional space of a sequence, the second approach of performing M subtractions would not be possible, as this would null out the entire received signal. However, the first approach is possible, in which nulling can be performed in either the Walsh domain or the time domain.

While pre-orthogonalization at the receiver has been described, it will be readily apparent to one skilled in the art that pre-orthogonalization can be applied at the transmitter, so that the transmitted signals are orthogonal but not necessarily ±1 in value. One interesting case is when a pilot signal is transmitted along with one or more user signals. By pre-orthogonalizing the user signals with respect to the pilot signal, the interference from the user signals is removed, so that the receiver can get a better pilot signal, and hence a better estimate of the channel as well as timing. At the receiving end, the original signature sequences may still be used for detection purposes.

Another use of pre-orthogonalization at the transmitter would be to avoid interference between cells in a cellular system. The sequences used in one cell, which may already be orthogonal or modified to be orthogonal, could be made orthogonal to sequences used in one or more nearby cells. Thus, modified signature sequences used in nearby cells would not interfere with each other, or they would interfere less with one another.

Figure 7:
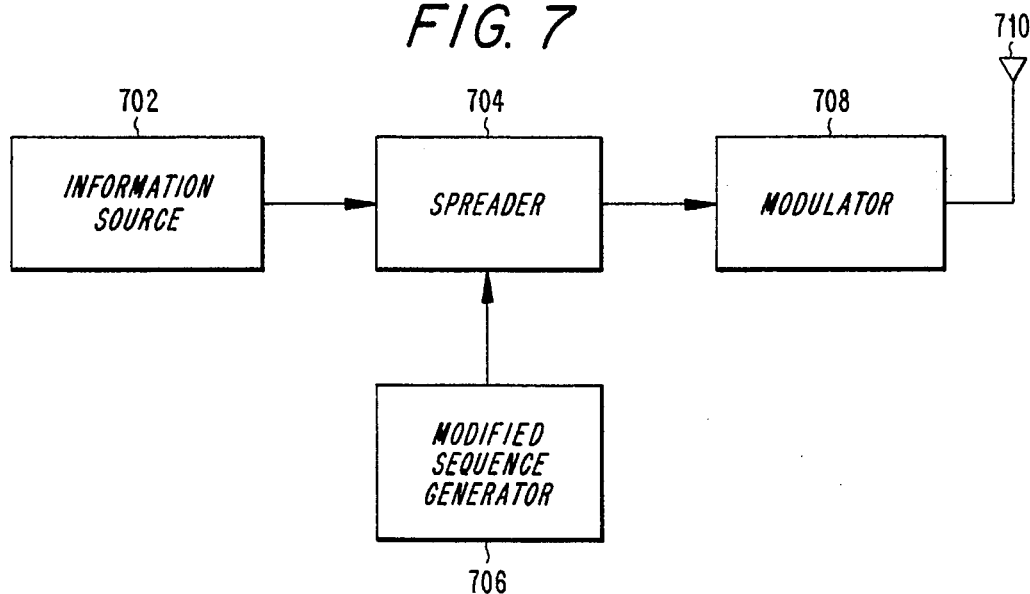
FIG. 7 is a block diagram of an exemplary transmitter according to the present invention.
Figure 8:
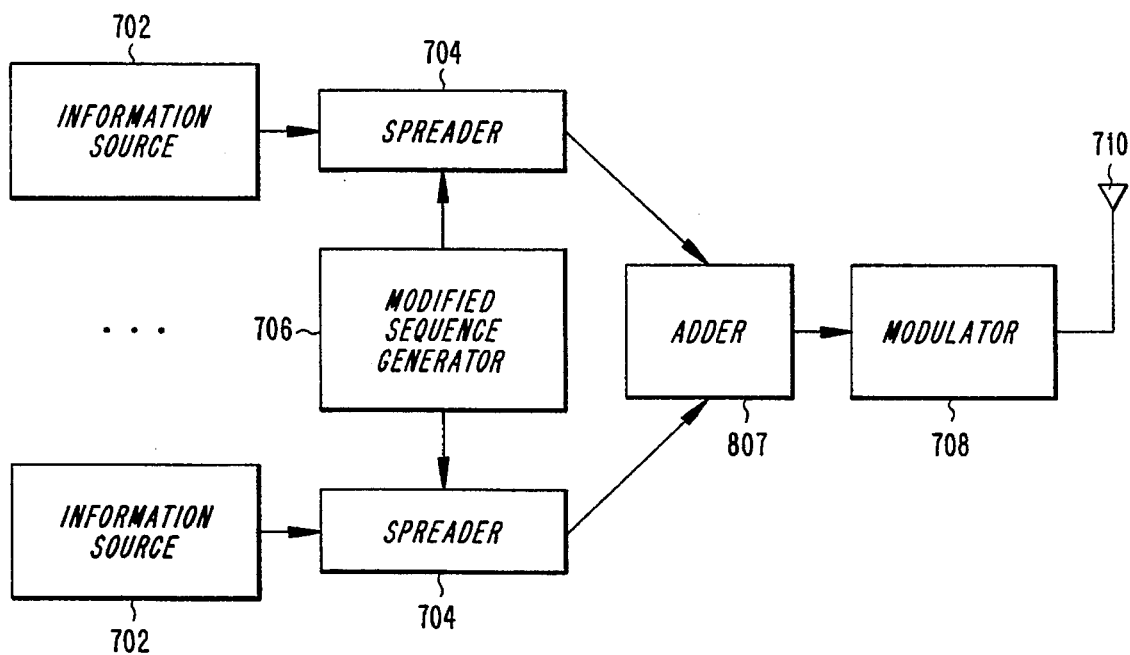
FIG. 8 is a block diagram of another exemplary embodiment of a transmitter.

An exemplary embodiment of a transmitter using pre-orthogonalization is shown in FIG. 7. An information source 702 provides information, typically binary information symbols, that are to be transmitted. These symbols are spread in spreader 704, using modified signature sequences provided by generator 706. The spread signal is modulated in modulator 708 then conveyed to the transmission medium using transmit antenna 710. Typically, a plurality of signals would be transmitted, as illustrated in FIG. 8, where like elements with those in FIG. 7 use the same reference numeral. A plurality of spread signals are added together in adder 807 prior to modulation and transmission.

Figure 9:
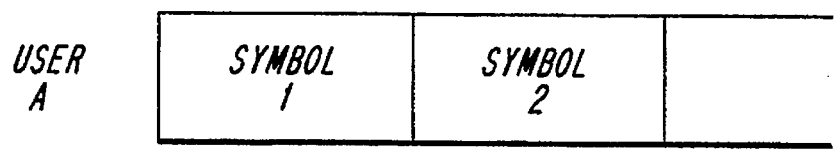
FIG. 9 illustrates symbol timing according to exemplary embodiments of the present invention.
Figure 9:
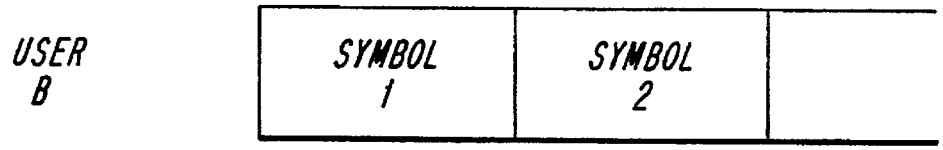

So far, the examples given have been for the case where all user signals are synchronized. There are some situations where this not the case, so that users are asynchronous. An example is given in FIG. 9. In this example, the first and second symbols of user A overlap with the first symbol of user B. One way to apply improved subtraction pre-orthogonalization to asynchronous transmissions is as follows. First, both the first and second symbols of user A would be detected and removed from the composite signal. Then, the first symbol of user B would be detected and removed. When removing the first symbol of user B, pre-orthogonalization would be performed with respect to a hybrid sequence for user A, where the hybrid sequence is obtained by taking the latter part of user A's first detected symbol and appending the first part of user A's second detected symbol. With the improved detection scheme, a similar pre-orthogonalization with respect to the hybrid sequence would occur.

So far, the examples given have been or a frequency-nonselective channel, in which there are no echoes due to time dispersion. In practice, many CDMA systems experience time dispersion. The pre-orthogonalization approach is readily extended to this case. First, detection statistics for each image of the strongest signal, signal A, would be formed, where each image is a ray or echo of the signal. The statistics would then be combined using, for example, Rake combining, to produce an overall statistic for user A. Then, all or some of the rays of signal A would be removed. Then, signal B would be detected. When removing signal B, pre-orthogonalization may occur in a number of ways. First, each ray of signal B may be pre-orthogonalized with respect to all the rays of signal A, and possibly with respect to the other rays of signal B. To reduce complexity, it may be desirable to pre-orthogonalize each ray of signal B with only a subset of the other rays, perhaps even only the ray of signal A that is aligned with the ray of signal B, if it exists. The process then continues for subsequent signals. While this example is based on the subtraction approach according to the present invention, similar examples can be given based on the detection approach.

In the time dispersion case, pre-orthogonalization may also be used in other ways. First, when forming detection statistics for each image or ray of the signal, detection pre-orthogonalization according to the present invention may be applied to the different shifts of the signature sequence, preventing inter-ray interference or self interference when forming the statistics. Second, when subtracting the rays of a signal, improved subtraction pre-orthogonalization may be applied to the different shifts of the signature sequence to prevent subtraction error from a series of subtractions for one signal. Pre-orthogonalization can also be useful when detecting whether a ray is present or not. For example, known rays can be removed first, and a modified sequence can be used for the detection of possible rays.

The present invention can be applied to a variety of applications, such as cellular or PCS communication systems. It can also be applied to packet radio systems, such as Aloha-based systems, so that when packet collisions occur, it may still be possible to demodulate more than one packet. While the particular embodiments given use baseband signal processing techniques, it will be readily apparent to one of ordinary skill in the art that the present invention can be applied to intermediate frequency processing techniques, including the use of analog devices. For example, the correlator function may be performed at an intermediate frequency, using a multiplier and a filter.

Although exemplary embodiments of the present invention have been described and illustrated herein to facilitate understanding of the present invention, it should be understood that the present invention is not limited thereto since modifications may be made by persons skilled in the art. The present application contemplates any and all modifications that fall within the spirit and scope of the underlying invention disclosed and claimed herein.

What is claimed is:

1. A receiver comprising:

means for receiving a composite signal;

means for processing said composite signal to produce a processed composite signal;

means for correlating said processed composite signal with a plurality of signature sequences to produce at least one correlation;

means for detecting a particular signal within said composite signal using said at least one correlation;

means for modifying said signature sequences to produce modified signature sequences; and means for removing said particular signal from said processed composite signal using said modified signature sequences.

2. The receiver of claim 1, wherein said means for modifying said signature sequences further comprises:

means for orthogonalizing said plurality of signature sequences with respect to others of said plurality of signature sequences.

3. The receiver of claim 2, wherein said means for orthogonalizing uses a Gram-Schmidt procedure to orthogonalize each of said plurality of signature sequences.

4. The receiver of claim 1, wherein said composite signal is modulated as a direct sequence CDMA signal.

5. A receiver comprising:

means for receiving a composite signal;

means for processing said composite signal to produce a processed composite signal;

means for correlating said processed composite signal with a plurality of signature sequences to produce at least one correlation;

means for detecting a particular signal within said composite signal using said at least one correlation; and means for removing said particular signal from said processed composite signal by a sequence of subtractions, said sequence of subtractions being performed using coefficients related to a modified signature sequence associated with said particular signal.

6. The receiver of claim 5, further comprising:

means for generating said modified signature sequence by orthogonalizing a signature sequence associated with said particular signal with respect to others of said plurality of signature sequences.

7. The receiver of claim 6, wherein said means for generating uses a Gram-Schmidt procedure to orthogonalize said signature sequence.

8. The receiver of claim 5, wherein said composite signal is modulated as a direct sequence CDMA signal.

9. A receiver comprising:

means for receiving a composite signal;

means for processing said composite signal to produce a processed composite signal;

means for additively modifying signature sequences associated with signals which have been combined to form said composite signal;

means for correlating said processed composite signal with said modified signature sequences to produce at least one correlation; and means for detecting a particular signal within said composite signal using said at least one correlation.

10. The receiver of claim 9, wherein said means for modifying further comprises:

means for generating said modified signature sequences by orthogonalizing original signature sequences associated with said signals with respect to others of said original signature sequences.

11. The receiver of claim 10, wherein said means for generating uses a Gram-Schmidt procedure to orthogonalize said signature sequences.

12. A receiver comprising:

means for receiving a composite signal;

means for processing said composite signal to produce a processed composite signal;

means for correlating said processed composite signal with signature sequences to produce a plurality of correlations;

means for combining said correlations corresponding to a plurality of signature sequences to produce at least one statistic associated with a particular signal; and means for detecting a particular signal using said at least one statistic.

13. The receiver of claim 12, wherein said combining means further comprises:

means for generating modified signature sequences by orthogonalizing each original signature sequence associated with said signals with respect to others of said original signature sequences.

14. The receiver of claim 13, wherein said means for generating uses a Gram-Schmidt procedure to orthogonalize said signature sequences.

15. A transmitter comprising:

means for modifying a plurality of signature sequences to produce modified signature sequences;

means for spreading information using one or more of said modified signature sequences to produce a plurality of spread signals;

means for combining said spread signals to produce a composite spread signal; and means for modulating and transmitting said composite spread signal.

16. A transmitter according to claim 15, wherein said means for modifying said signature sequences further comprises:

means for orthogonalizing said plurality of signature sequences with respect to others of said plurality of signature sequences.

* * * * *